(12) United States Patent
Houle et al.

(10) Patent No.: US 8,643,233 B2
(45) Date of Patent: Feb. 4, 2014

(54) MULTI-PATH LIQUID COOLING ARRANGEMENT FOR ELECTRIC MACHINES

(75) Inventors: Martin Houle, Laval (CA); Bruno Carpentier, St-Basile-le-Grand (CA); George Bursuc, Brossard (CA); Steve Fleming, Boucherville (CA); Mathieu Guertin, McMasterville (CA); François Messier, Varennes (CA)

(73) Assignee: TM4 Inc., Quebec (CA)

( * ) Notice: Subject to any disclaimer, the term of this patent is extended or adjusted under 35 U.S.C. 154(b) by 0 days.

(21) Appl. No.: 13/056,066

(22) PCT Filed: Jun. 22, 2009

(86) PCT No.: PCT/CA2009/000869
§ 371 (c)(1),
(2), (4) Date: May 5, 2011

(87) PCT Pub. No.: WO2010/012070
PCT Pub. Date: Feb. 4, 2010

(65) Prior Publication Data
US 2011/0278968 A1 Nov. 17, 2011

Related U.S. Application Data

(60) Provisional application No. 61/129,892, filed on Jul. 28, 2008.

(51) Int. Cl.
*H02K 9/00* (2006.01)

(52) U.S. Cl.
USPC .................................. 310/52; 310/54

(58) Field of Classification Search
USPC ................................. 310/52, 54, 57
See application file for complete search history.

(56) References Cited

U.S. PATENT DOCUMENTS

| | | | | |
|---|---|---|---|---|
| 3,801,843 A | * | 4/1974 | Corman et al. | 310/52 |
| 3,963,950 A | * | 6/1976 | Watanabe et al. | 310/54 |
| 4,814,651 A | | 3/1989 | Elris et al. | |
| 6,265,801 B1 | * | 7/2001 | Hashiba et al. | 310/214 |
| 6,633,097 B2 | * | 10/2003 | Dunlap et al. | 310/54 |
| 6,819,016 B2 | * | 11/2004 | Houle et al. | 310/52 |
| 6,960,851 B2 | * | 11/2005 | Poulin et al. | 310/52 |
| 6,992,411 B2 | * | 1/2006 | Houle et al. | 310/52 |
| 7,635,932 B2 | * | 12/2009 | Matin et al. | 310/58 |
| 8,110,960 B2 | * | 2/2012 | Bischof et al. | 310/227 |
| 8,269,381 B2 | * | 9/2012 | Auernhammer | 310/54 |

FOREIGN PATENT DOCUMENTS

| | | |
|---|---|---|
| CA | 2417405 | 7/2004 |
| CA | 2486922 | 4/2008 |

* cited by examiner

*Primary Examiner* — Dang Le
(74) *Attorney, Agent, or Firm* — Fay Kaplun & Marcin, LLP

(57) ABSTRACT

A multi-path liquid cooling arrangement for electric machines includes a heat storing element provided with channels having a generally C-shaped cross-section and cooling tubes so configured and sized as to be insertable in the channels is described herein. The cooling tubes, once inserted in the channels, are deformed to conform thereto, whereby heat stored in the heat storing element is extracted by circulating cooling fluid inside the cooling tubes.

15 Claims, 11 Drawing Sheets

MULTI-PATH LIQUID COOLING ARRANGEMENT FOR ELECTRIC MACHINES

FIELD

The present invention relates to electric machines. More specifically, the present invention is concerned with a multi-path liquid cooling arrangement for electric machines.

BACKGROUND

Electric machines, motors or generators, are well known in the art. It is also widely known that electric machines generate heat as a by-product and that this heat must be somehow extracted from the machine to improve the performance of the machine and/or prevent early degradation thereof.

Electric machines are often conventionally air-cooled. This is easily done by providing apertures in the body of the machine to force air therein. The efficiency of such a cooling arrangement is often poor since air is a generally low efficiency cooling fluid. Furthermore, some electric machines operate in environments that are such that it is not possible to provide an electric machine with apertures to allow air therein. Accordingly, fluid cooling arrangements for electric machines have also been designed.

Some permanent magnet electric machines are provided with an internal stator and an external rotor generally enclosing the stator. When this is the case, the stator has a generally cylindrical body and coils are so mounted to the cylindrical body as to produce a magnetic field that interacts with the externally provided rotor. Since the heat is generally generated in the stator that is somewhat enclosed by the rotor, it may be difficult to install a fluid cooling arrangement inside an enclosed stator of such an external rotor electric machine.

DETAILED DESCRIPTION

In accordance with an illustrative embodiment, there is provided a multi-path cooling arrangement for electric machines comprising:

a generally cylindrical and longitudinal stator provided with a central aperture defining an inner surface provided with generally C-shaped longitudinal outer channels and with inwardly projecting tabs each provided with at least one generally C-shaped longitudinal inner channel; and at least two cooling tubes so configured and sized as to be inserted in the inner and outer C-shaped channels of the stator;

wherein heat present in the stator is extractable by said cooling tube.

According to another illustrative embodiment, there is provided a stator provided with an integrated multi-path cooling arrangement, the stator comprising:

a plurality of stacked laminations each provided with a central aperture defining an inner surface of the stator; the inner surface being provided with generally C-shaped outer channels and with inwardly projecting tabs each provided with at least one generally C-shaped inner channel; and at least two cooling tubes so configured and sized as to be inserted in the inner and outer C-shaped channels of the stator;

wherein heat present in the stator is extractable by said cooling tube.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification in the appended claims, various terminology which is directional, geometrical and/or spatial in nature such as "longitudinal", "horizontal", "front", "rear", "upwardly", "downwardly", etc. is used. It is to be understood that such terminology is used for ease of description and in a relative sense only and is not to be taken in any way as a limitation upon the scope of the present disclosure.

It is to be noted that the expression "electric machine" is to be construed herein as encompassing both electric motors and electric generators disregarding the technology used in these machines.

Other objects, advantages and features will become more apparent upon reading of the following non-restrictive description of preferred embodiments thereof, given by way of example only with reference to the accompanying drawings.

Generally stated, multi-path cooling arrangements according to illustrative embodiments use the stacked laminations of the stator as a heat storing element provided with channels, having a C-shaped cross-section and provided on more that one level of the laminations, in which cooling tubes are mounted. In operation, cooling fluid is circulated in the cooling tubes to extract heat temporarily stored in the laminations. Since cooling tube receiving channels are provided on more than one level of the laminations, the density of cooling tubes can be increased.

Figure 1:
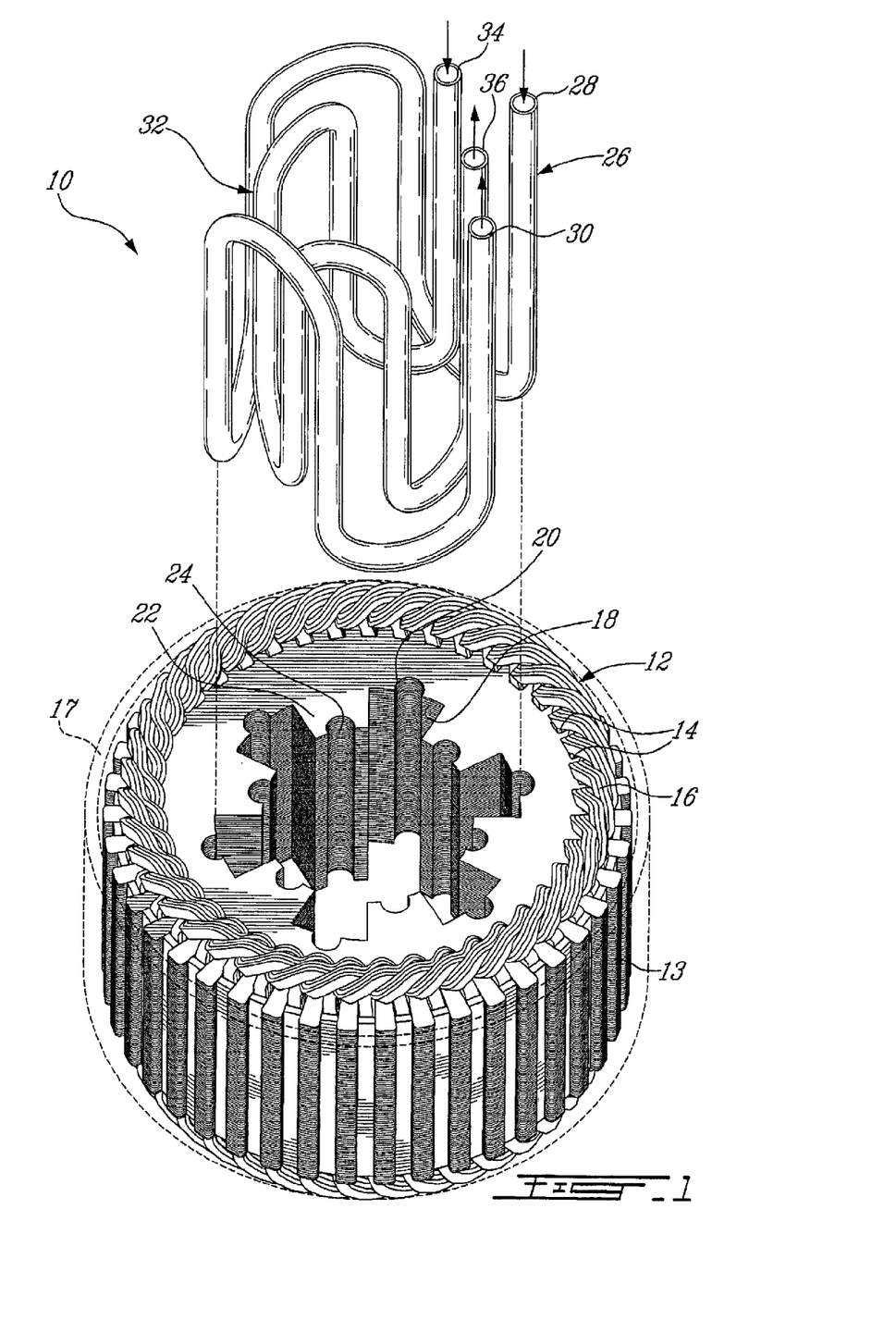
FIG. 1 is a perspective, partly exploded view, of the stator of an electric machine provided with a cooling arrangement according to a first illustrative embodiment.

A multi-path cooling arrangement 10 according to a first illustrative embodiment, illustrated in FIGS. 1 to 3, will now be described. More specifically, FIG. 1 shows a stator 12 of an electric machine (not shown). The stator 12 is made of a plurality of identical laminations 13 stacked together. The stator 12 is generally cylindrical, provided with a central aperture, and includes rectangular external channels 14 in which coils 16 are mounted. It is to be noted that the stator 12 is a so-called internal stator, i.e. that the rotor 17 (schematically shown in dashed lines in FIG. 1) is so mounted to the stator 12 as to be coaxial and external thereto.

The laminations of the stator 12 are used as a heat storing element, as will be described hereinbelow.

The inside surface 18 of the stator 12, defined by the central aperture of the plurality of laminations 13, is provided with a plurality of outer channels 20 having a generally closed C-shaped cross section. The inside surface 18 is also provided with internally projecting tabs 22 each provided with an inner channel 24 having a generally closed C-shaped cross-section.

It is to be noted that the "outer" and "inner" terminology of the channels is determined with respect to their distance to the centre of the stator 12.

The cooling arrangement 10 includes a first outer cooling tube 26 having a generally circular cross-section and provided with an inlet 28 and an outlet 30. As can be clearly seen in FIG. 1, the first outer cooling tube 26 is so folded as to form a serpentine.

The cooling arrangement 10 also includes a second inner cooling tube 32 having a generally circular cross-section and provided with an inlet 34 and an outlet 36. As can be clearly seen in FIG. 1, the second inner cooling tube 32 is so folded as to form a serpentine.

It is to be noted that the "outer" and "inner" terminology of the cooling tubes is determined with respect to their distance to the centre of the stator 12.

Figure 2:
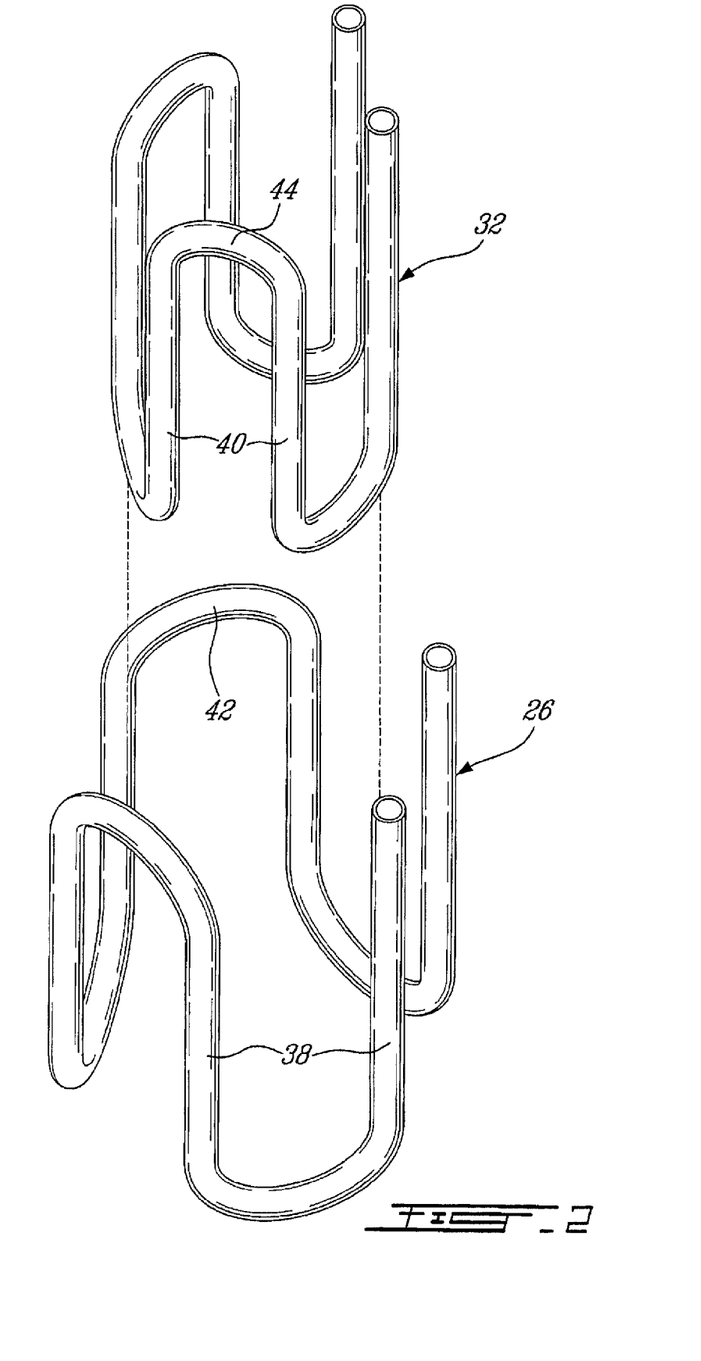
FIG. 2 is a perspective view of the cooling tubes of the cooling arrangement of FIG. 1.

FIG. 2 illustrates the cooling tubes 26 and 32. Both tubes 26 and 32 include respective straight longitudinal portions 38 and 40, configured and sized to be inserted in the channels 20 and 24 of the stator 12, and respective curved portions 42 and 44 interconnecting the straight longitudinal portions and integral therewith.

The curved portions 42 and 44 of the cooling tubes 26 and 32 are so configured that they extend outside of the stator 12. This arrangement may be interesting since is allows the curved portions 42 and 44 of the cooling tube to be folded outwardly (not shown) to increase the contact surface between the cooling tubes 26 and 32 and the stator 12.

Figure 3A:
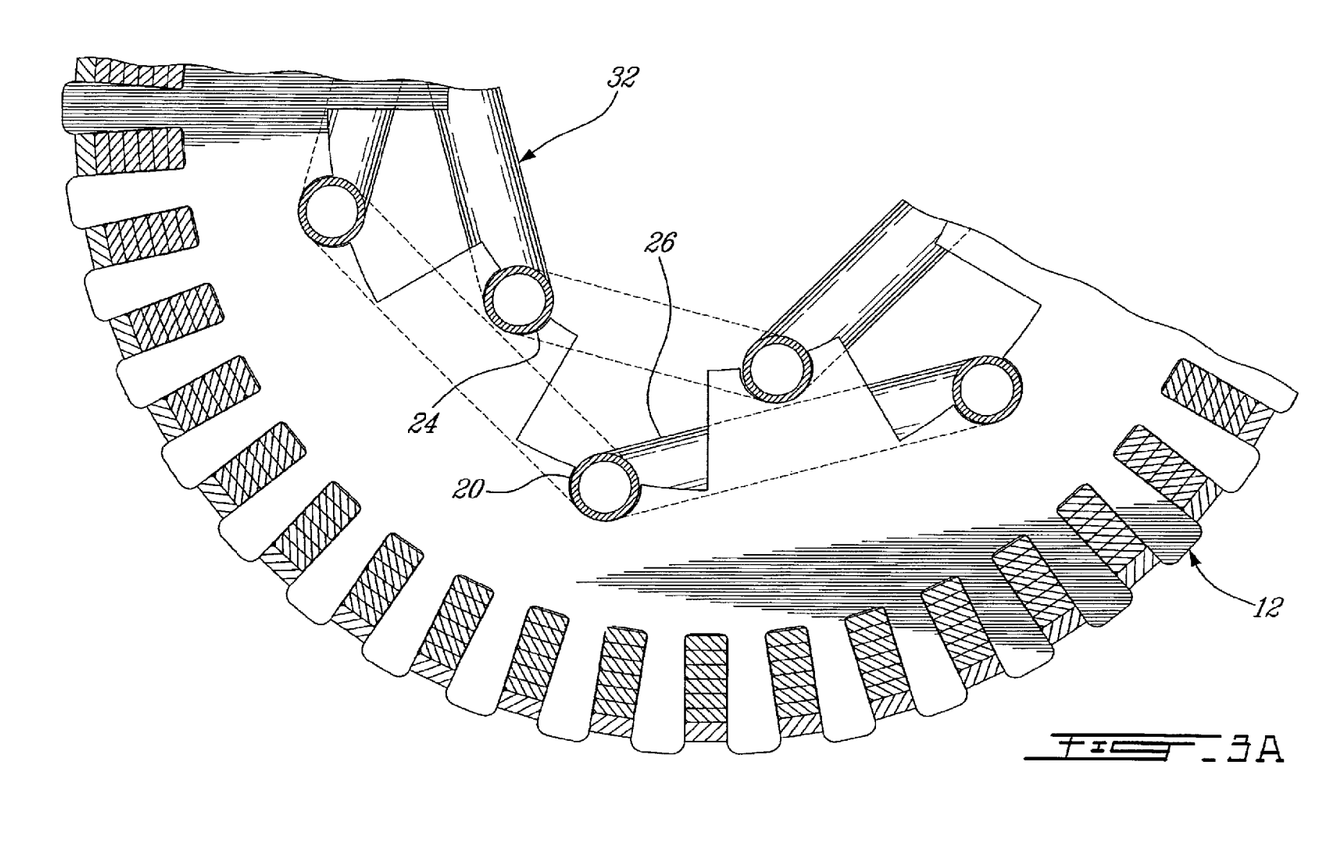
FIG. 3A is a top plan view of the stator of FIG. 1 illustrating the position of the cooling tubes therein.

Turning now to FIG. 3A, it can be better seen that each channel 20 and 24 has a generally closed C-shape configuration, i.e. that the opening of the channel is smaller than the widest portion of the channel. It is also to be noted that the circular cross section of the cooling tube 22 is at most equal to the opening of the channel to allow its insertion therein.

To insert the first outer cooling tube 26 in the channels 20, a first step is to generally align the straight portions 38 of the cooling tube 26 with a corresponding outer channel 20 of the stator 12. This operation is facilitated by the possibility to significantly deform the serpentine configuration of the outer cooling tube 26 to allow its insertion into the central opening of the stator 12.

The next insertion step is to deform the serpentine configuration of the cooling tube 26 so that each straight section is inserted in a corresponding channel 20.

Figure 3B:
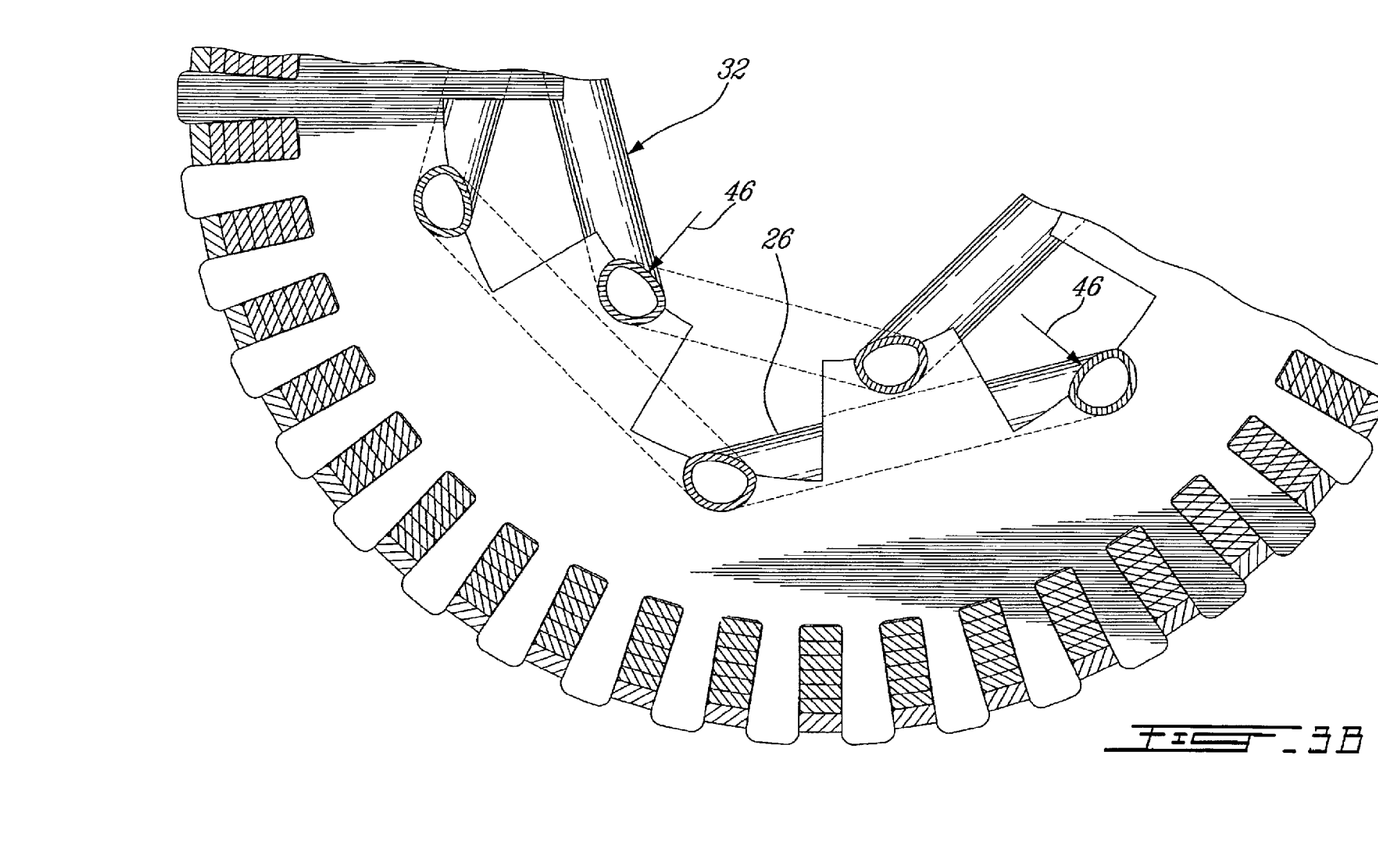
FIG. 3B is a top plan view similar to FIG. 3A but illustrating the deformed cooling tubes.

Turning now to FIG. 3B, to maintain the straight portions of the cooling tube 26 into the channels 20, the straight portions 38 are advantageously deformed to conform to the generally closed C-shaped configuration of the channels 20. To achieve this, a pressure (see arrows 46) is radially and outwardly applied onto the cooling tube 26. This radial pressure causes the widening of the tube until they conform to the channels.

It is to be noted that, optionally, a heat conducting and/or adhesive substance may be placed between the channel and the tube to improve the heat transfer between these elements.

Similar steps are performed to mount the inner cooling tube 32 in the inner channels 24.

It is also to be noted that while many materials can be used for the cooling tubes 26 and 32, good results have been obtained by using copper tubing.

The inlets 28 and 34 of the cooling tubes 26 and 32 may be interconnected so that the cooling arrangement has only one inlet and the outlets 30 and 36 of the cooling tubes 26 and 32 may be interconnected so that the cooling arrangement has only one outlet. Alternatively, these inlets and outlets may be kept separate so as to have two independent cooling paths for redundancy reasons.

Figure 4:
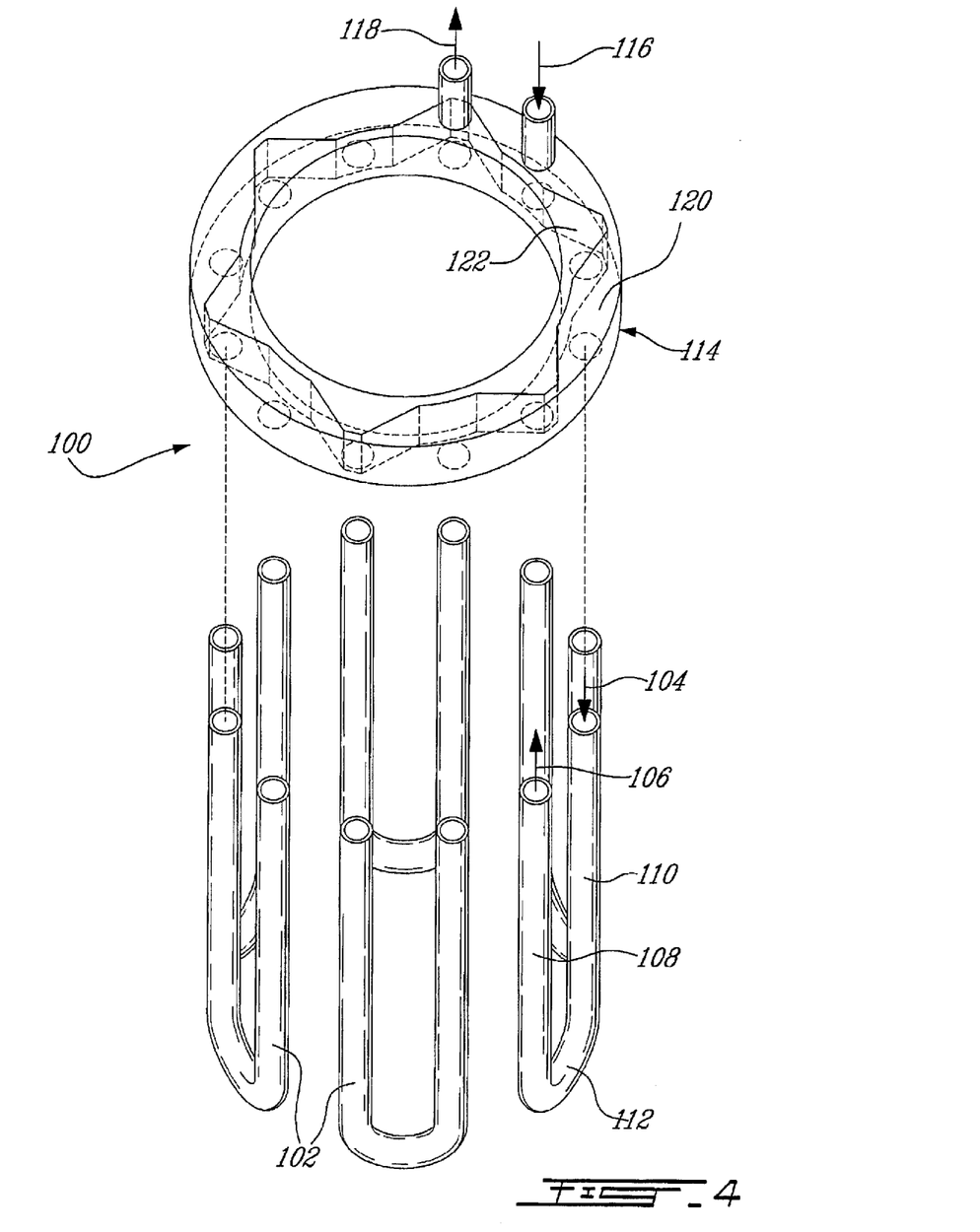
FIG. 4 is a perspective view illustrating a cooling arrangement according to a second illustrative embodiment where a manifold is used to interconnect cooling tubes.
Figure 5:
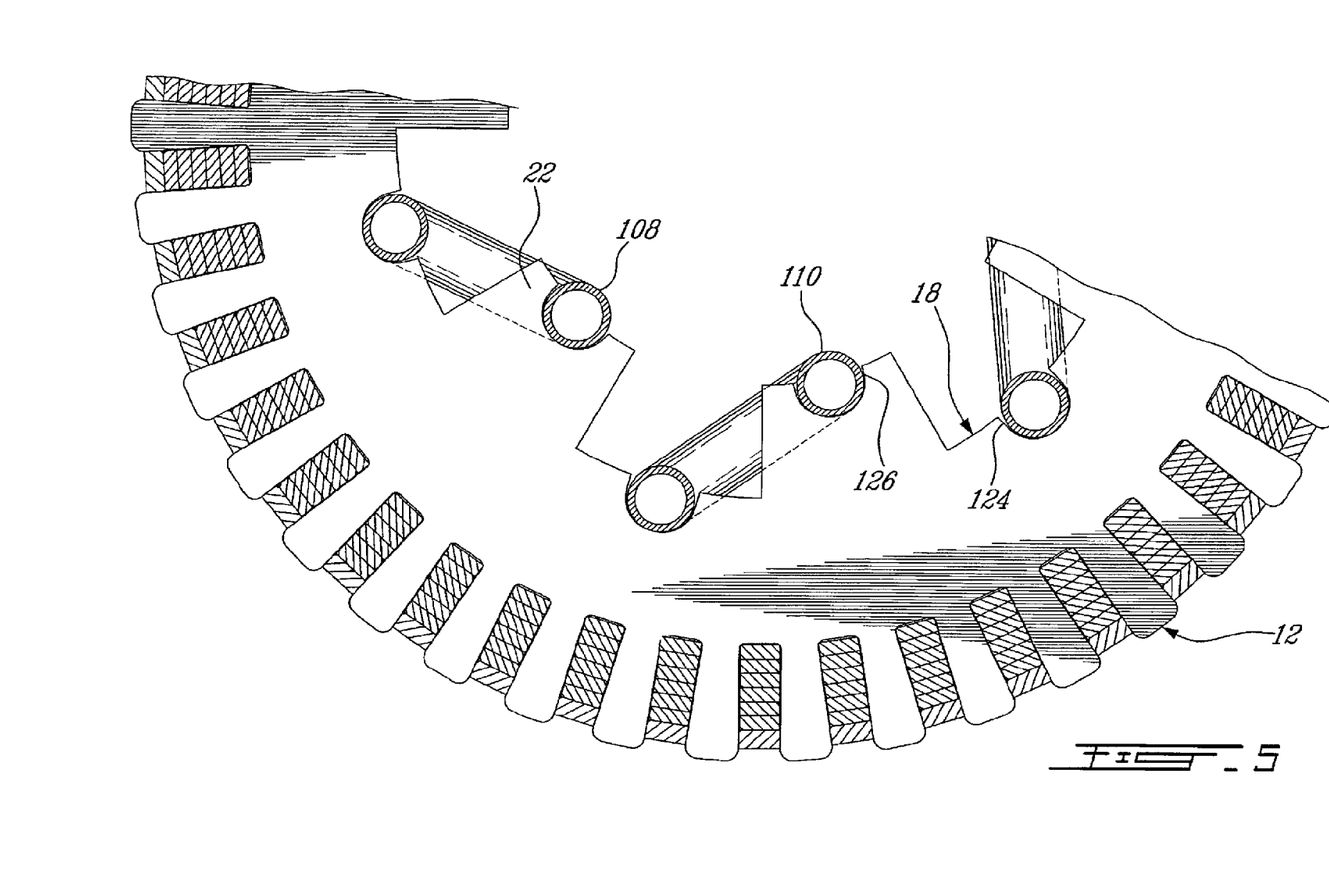
FIG. 5 is a top plan view of a stator provided with the cooling arrangement of FIG. 4.

Turning now to FIGS. 4 and 5, a cooling arrangement 100 according to a second embodiment will now be described.

The cooling arrangement 100 includes six cooling tubes 102 each including an inlet 104 and an outlet 106. Each tube 102 also includes two straight portions 108 and 110 and a curved portion 112 interconnecting the straight portions 108 and 110. In other words, each tube 102 is generally U-shaped.

As can be schematically seen from FIG. 4, the cooling arrangement 100 also includes an input and output manifold 114 provided with an inlet 116 and an outlet 118. The inlet 116 is connected to an inlet chamber 120 to which the inlets 104 of the cooling tubes 102 are connected. Similarly, the outlet 118 is connected to an outlet chamber 122 to which the outlets 106 of the cooling tubes 102 are connected.

As can be better seen from FIG. 5, the inside surface 18 of the stator 12 is provided with a plurality of outer channels 124 having a generally open C-shaped cross section. The inside surface 18 is also provided with internally projecting tabs 22 each provided with an inner channel 126 having a generally open C-shaped cross-section.

The C-shaped channels 124 and 126 have a generally open C-shape configuration, i.e. that the opening of the channel is the same width as the widest portion of the channel.

It is also clear from FIG. 5 that the straight portions 108 are inserted in the outer C-shaped channels 124 and that the straight portions 110 are inserted in the inner C-shaped channels 126.

It is to be noted that, optionally, a heat conducting and/or adhesive substance may be placed between the channels and the tubes to improve the heat transfer between these elements. It is also to be noted that the straight portions 108 and 110 may be deformed to conform to the open C-shaped channels 124 and 126.

As will easily be understood by one skilled in the art, the configuration of the manifold 114 has been schematically shown herein. It is believed to be within the skills of one skilled in the art to design an adequate manifold or manifold assembly to interconnect the tubes 102.

Figure 6:
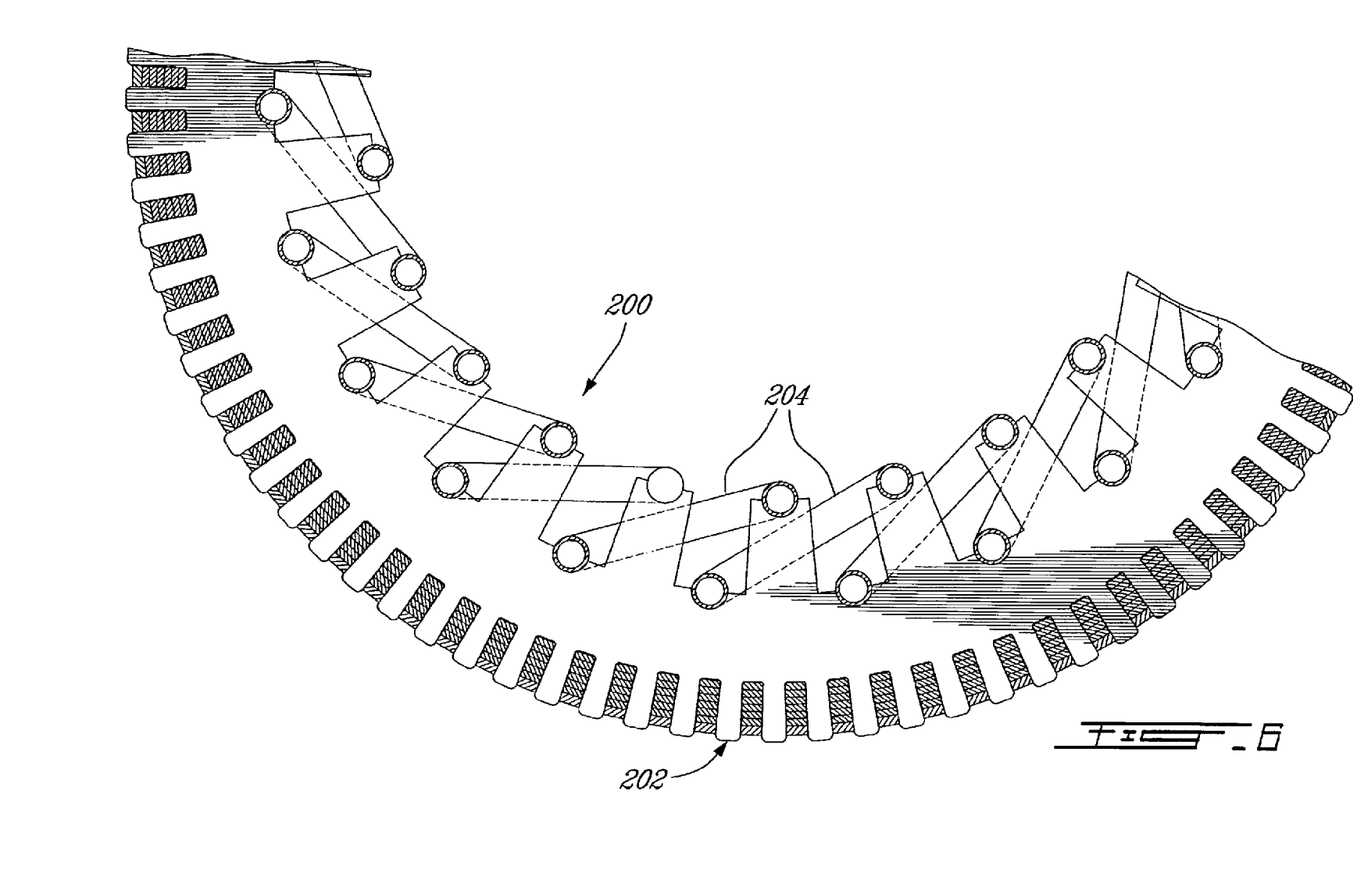
FIG. 6 is a top plan view illustrating a cooling arrangement according to a third illustrative embodiment.

Turning now to FIG. 6 of the appended drawings a multi-path cooling assembly 200 according to a third embodiment will now be described.

The multi-path cooling assembly 200 is very similar to the cooling assembly 100 of FIGS. 4 and 5 but is mounted to a larger diameter stator 202. The individual cooling tubes 204 are generally U-shaped.

As mentioned hereinabove, a heat conducting and/or adhesive substance may optionally be placed between the channels and the tubes to provide improved heat transfer between these elements.

Figure 7:
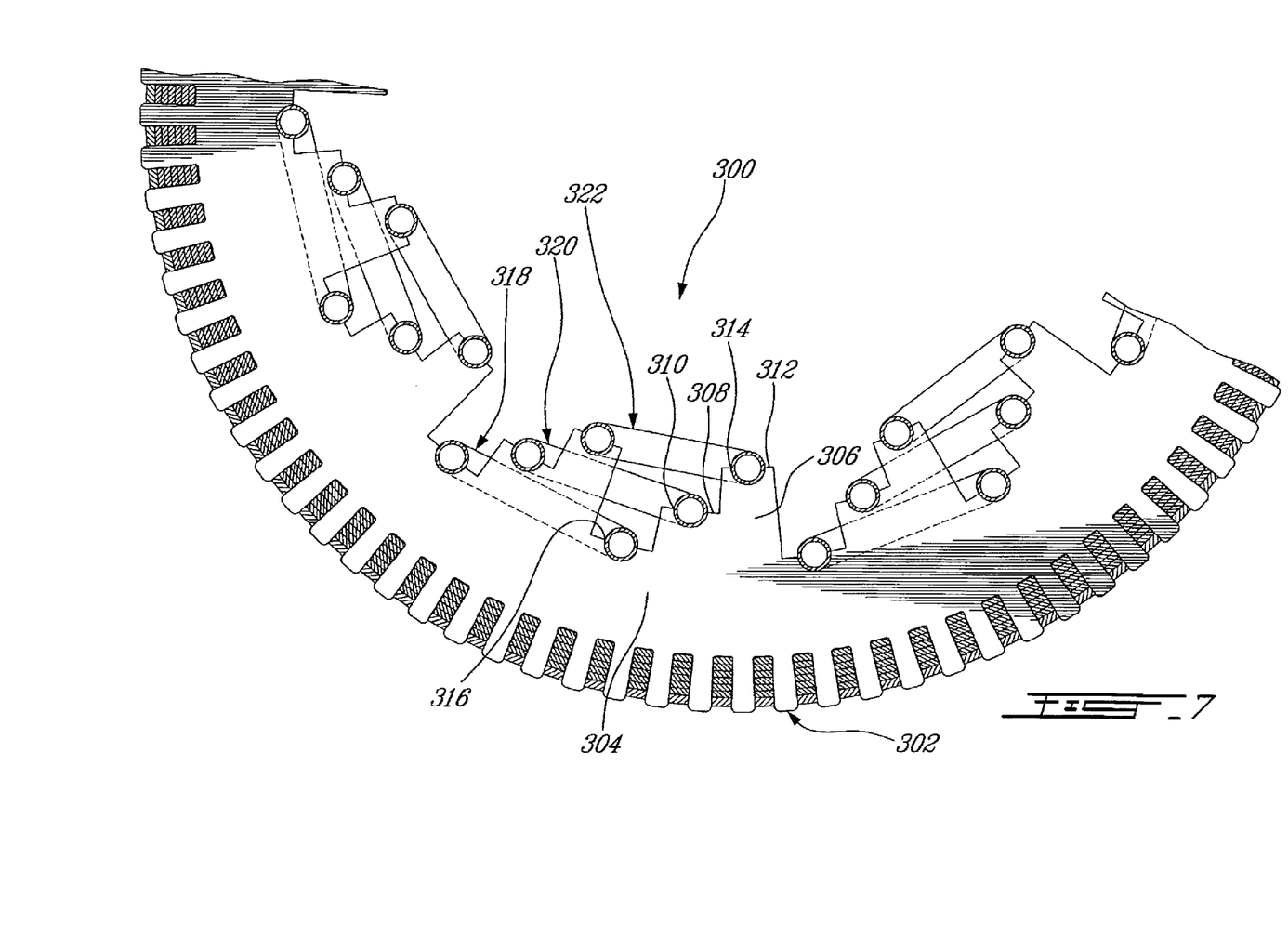
FIG. 7 is a top plan view illustrating a cooling arrangement according to a fourth illustrative embodiment.

Turning now to FIG. 7 of the appended drawings a multi-path cooling assembly 300 according to a fourth embodiment will now be described.

The multi-path cooling assembly 300 is similar to the cooling arrangement 10 of FIGS. 1 to 3 but has three levels and is mounted to a larger diameter stator 302, as will be described hereinbelow.

The laminations 304 making the stator 302 are provided with stair-like two-level inner projecting tabs 306. A first level 308 is provided with a C-shaped inner channel 310 while a second level 312 is provided with a C-shaped inner channel 314. Outer channels 316 are also provided between tabs 306.

The channels 310, 314 and 316 can have either of the above described closed or open C-shape configurations.

Serpentine cooling tubes 318, 320 and 322, similar to the cooling tubes 26 and 32 of FIG. 2 have straight portions that are respectively received in the channels 316, 310 and 314.

Alternatively, separate U-shaped cooling tubes (not shown) similar to the cooling tubes of FIG. 4 could be used.

Figure 8:
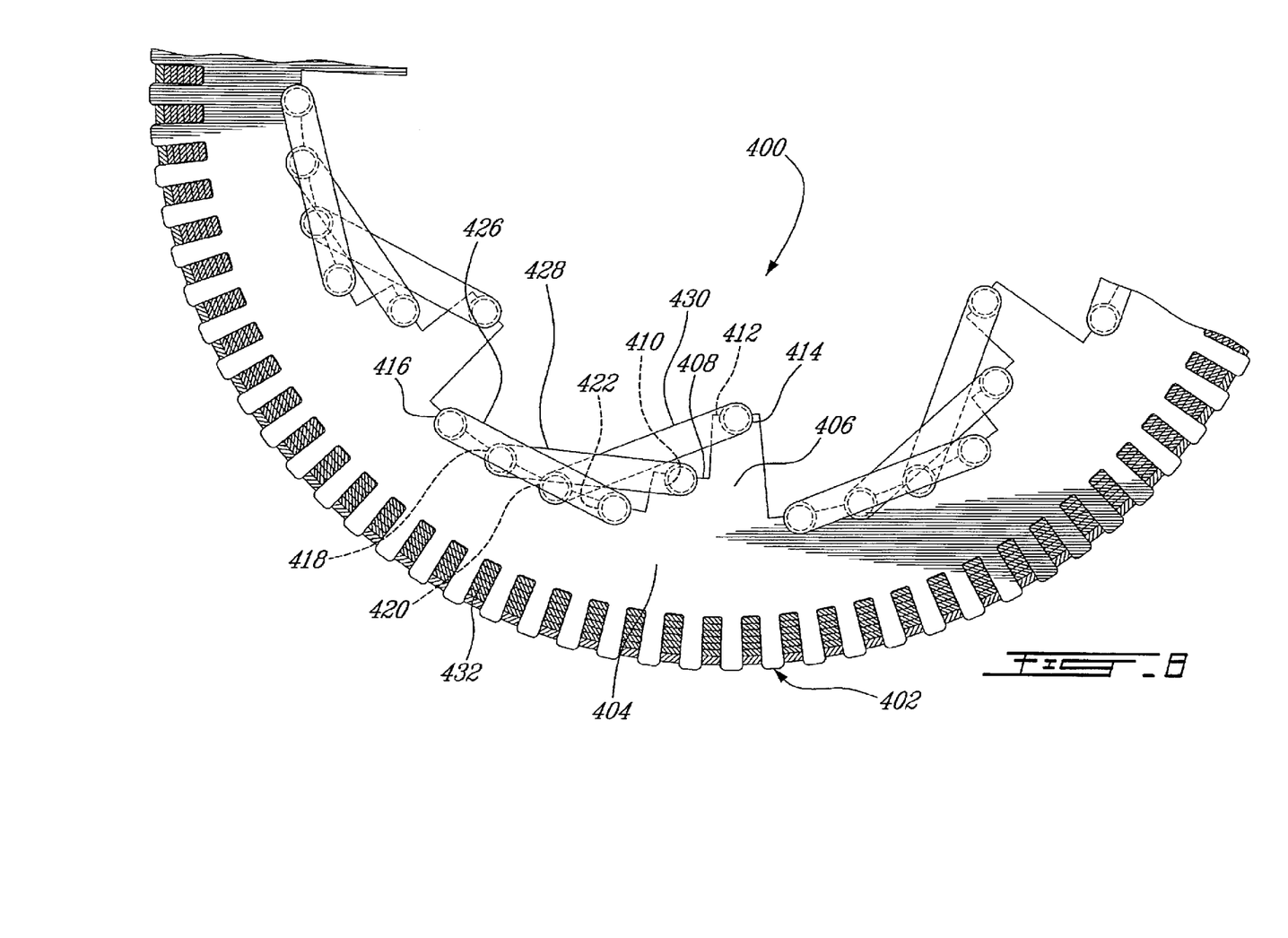
FIG. 8 is a top plan view illustrating a cooling arrangement according to a fifth illustrative embodiment.

Turning now to FIG. 8 of the appended drawings a multi-path cooling assembly 400 according to a fifth embodiment will now be described.

The laminations 404 making the stator 402 are provided with stair-like two-level inner projecting tabs 406. A first level 408 is provided with a C-shaped inner channel 410 while a second level 412 is provided with a C-shaped inner channel 414. Four outer C-shaped channels 416-422 are also provided between tabs 406.

Separate generally U-shaped cooling tubes 426, 428 and 430 are inserted in the channels 410, 414, 416-422. More specifically, the cooling tube 426 has a first straight portion inserted in the channel 416 and a second straight section inserted in the channel 422; the cooling tube 428 has a first straight portion inserted in the channel 418 and a second straight section inserted in the channel 410; and the cooling tube 430 has a first straight portion inserted in the channel 420 and a second straight section inserted in the channel 414.

The channels can have either of the above described closed or open C-shape configurations.

One skilled in the art will understand that the cooling tubes can be interconnected by a manifold or a manifold assembly (not shown).

It will be apparent to one skilled in the art that the interest of the cooling assembly 400 lies in the fact that more cooling tubes are provided near the coils 432 and are therefore more efficient at drawing heat close to its source.

Figure 9:
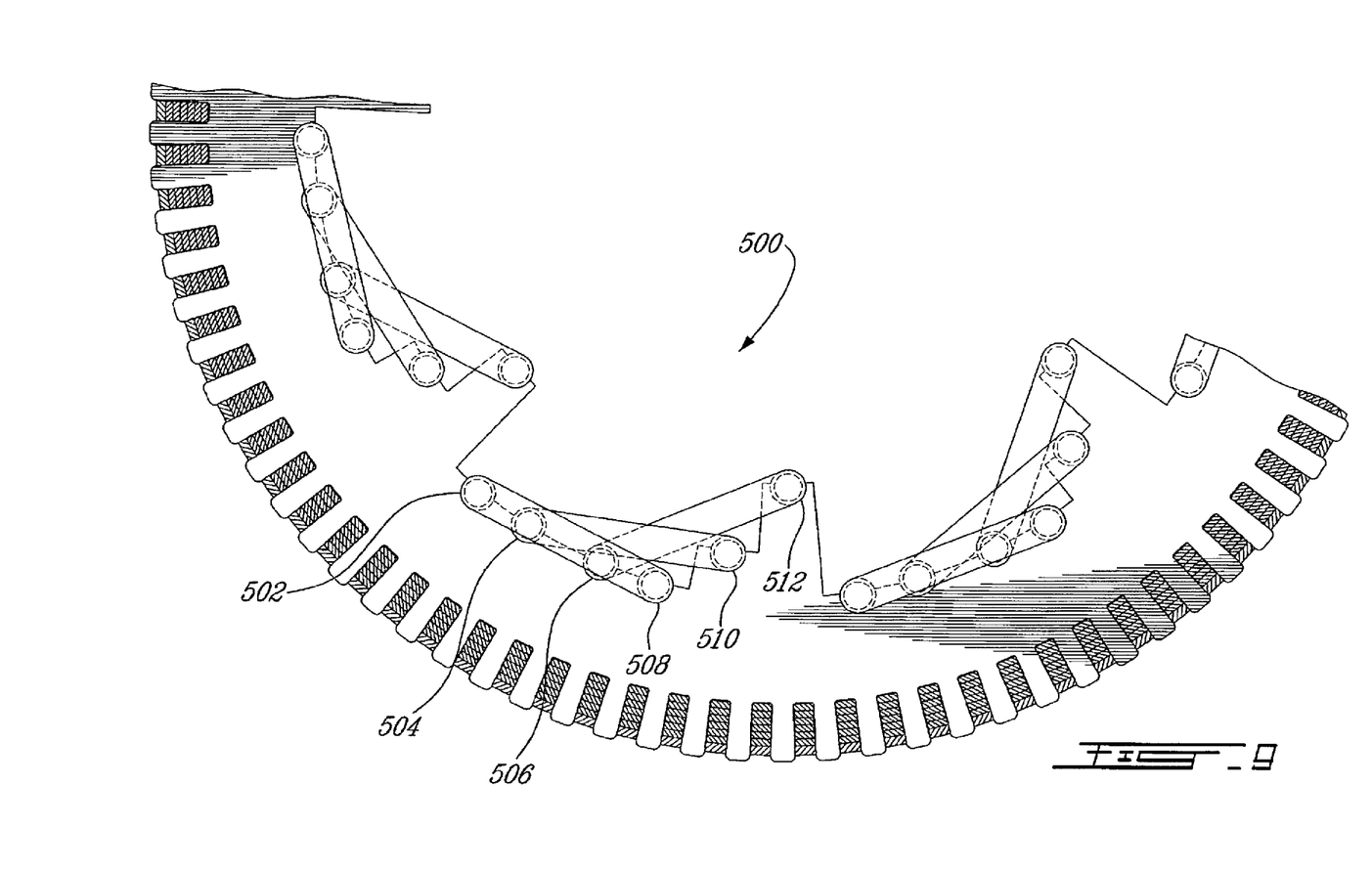
FIG. 9 is a top plan view illustrating a cooling arrangement according to a sixth illustrative embodiment.

Turning now to FIG. 9 of the appended drawings a multi-path cooling assembly 500 according to a sixth embodiment will now be briefly described.

The multi-path cooling assembly 500 is very similar to the multi-path cooling assembly 400 of FIG. 8 but the channels 502 to 512 have been so positioned and configured that the generally U-shaped cooling tubes 514, 516 and 518 are identical.

Figure 10:
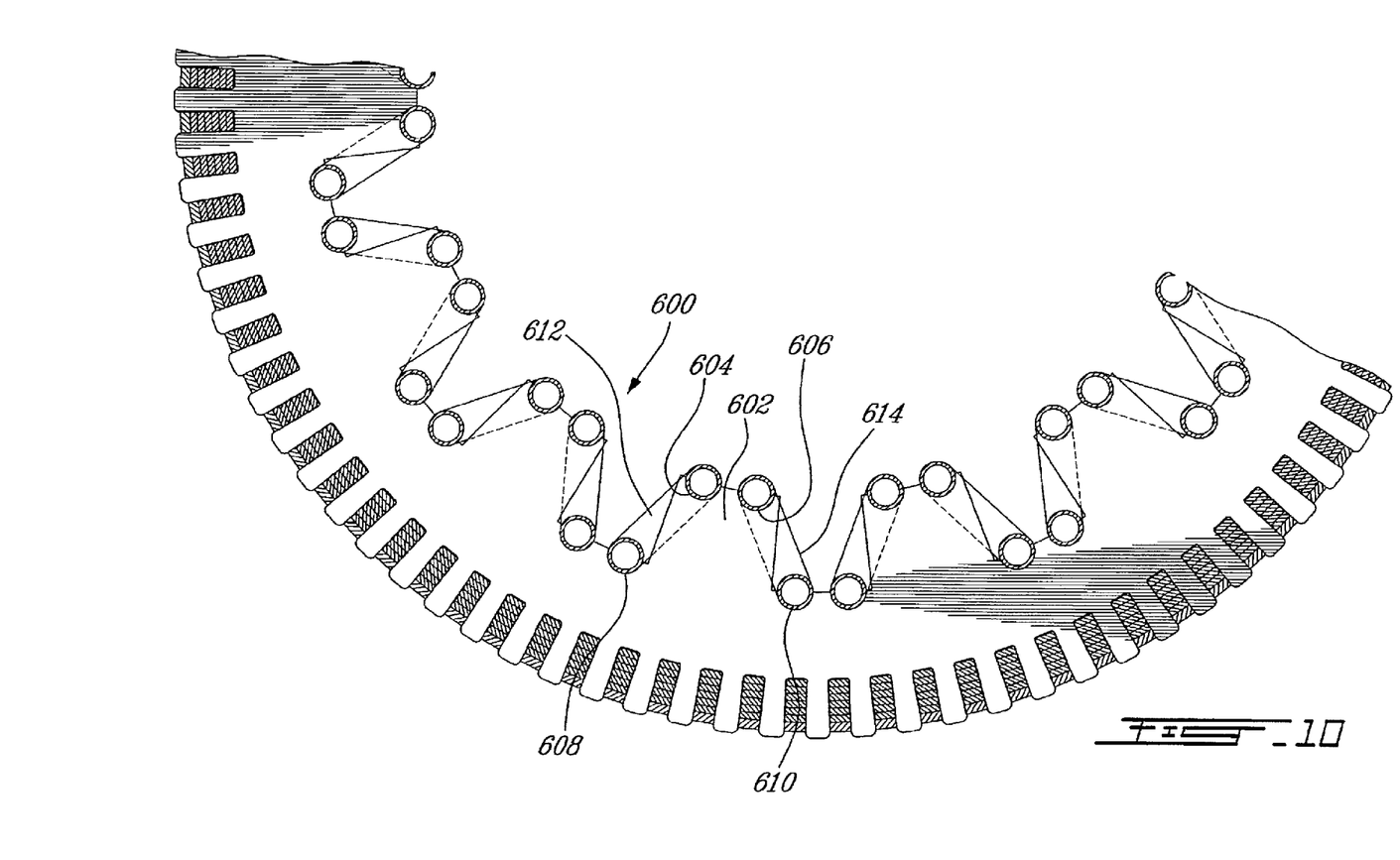
FIG. 10 is a top plan view illustrating a cooling arrangement according to a seventh illustrative embodiment.

Finally, turning to FIG. 10 of the appended drawings, a multi-path cooling assembly 600 according to a seventh embodiment will now be described.

The multi-path cooling assembly 600 includes identical tabs 602 each including two C-shaped inner channels 604 and 606. Two C-shaped outer channels 608 and 610 are provided between each tab 602. Identical U-shaped cooling tubes are inserted in the C-shaped channels. Cooling tube 612 has a first straight portion inserted in channel 604 and a second straight portion inserted in channel 608. Similarly, cooling tube 614 has a first straight portion inserted in channel 606 and a second straight portion inserted in channel 610. A curved portion (not shown) interconnects the first and second straight portions of the cooling tubes. A manifold (not shown) interconnects the straight portions inserted in channels 608 and 610 to define a cooling fluid inlet and the straight portions inserted in channels 604 and 606 to define a cooling fluid outlet.

It is to be noted that even though the illustrative embodiments have been illustrated as being part of an electric machine provided with an internal stator and an external rotor, one skilled in the art could easily adapt the present invention to be used in an electric machine having an external stator and an internal rotor.

It is also to be noted that while the embodiments have been described hereinabove as using an open cooling tube where a flow of fluid is used to extract the heat from the heat storing element, other cooling technologies, such as, for example, the heat pipe technology could be used. Indeed, one skilled in the art would have no problem designing or modifying conventionally known heat pipes so that they can be mounted in the C-shaped channels. For example, in the first embodiment illustrated in FIGS. 1-3, separate straight heat pipes (not shown) could be inserted in each longitudinal channel 20 and 24.

It will be understood by one skilled in the art that by providing tabs having cooling tube receiving channels, the density of cooling tubes may be increased without having small radius curved portions interconnecting the straight portions of the cooling tubes. Accordingly, cooling of the stator is more efficient. It is to be noted that the number of tabs and their positioning may vary depending on the level of cooling required and the size of the stator to be cooled, amongst others. As a non-limiting example, the laminations of a stator could have as few as two tabs.

It is to be noted that while a stator provided with identical tabs 22 have been discussed herein, a stator with tabs having different shape could also be designed. Shape and configuration of tabs creating more than two levels of cooling channels is also possible.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention.

What is claimed is:

1. A multi-path cooling arrangement for electric machines comprising:
    a generally cylindrical and longitudinal stator provided with a central aperture defining an inner surface provided with generally C-shaped longitudinal outer channels and with inwardly projecting tabs monolithically formed with the stator and each provided with at least one generally C-shaped longitudinal inner channel; and
    at least two cooling tubes so configured and sized as to be inserted in the inner and outer C-shaped channels of the stator;
    wherein heat present in the stator is extractable by said cooling tube.

2. A multi-path cooling arrangement as recited in claim 1, wherein the at least two cooling tubes include a first cooling tube so folded as to form a first serpentine having straight portions so configured and sized as to be inserted in the generally C-shaped outer channels and at least one second cooling tube so folded as to form a second serpentine having straight portions so configured and sized as to be inserted in the at least one generally C-shaped inner channels.

3. A multi-path cooling arrangement as recited in claim 1, wherein the at least two cooling tubes include a predetermined number of generally U-shaped cooling tubes having a circular cross-section; each generally U-shaped cooling tube including a first straight portion so configured and sized as to be inserted in one of the C-shaped outer channels, a second straight portion so configured and sized as to be inserted in one of the C-shaped inner channels and a curved portion interconnecting the first and second straight portions.

4. A multi-path cooling arrangement as recited in claim 3, further comprising a manifold assembly interconnecting the first and second straight portions of the plurality of U-shaped cooling tubes.

5. A multi-path cooling arrangement as recited in claim 4, wherein a) the manifold assembly interconnects the first straight portion of the plurality of U-shaped cooling together and includes a fluid inlet connected thereto and b) the manifold assembly interconnects the second straight portion of the plurality of U-shaped cooling together and includes a fluid outlet connected thereto.

6. A multi-path cooling arrangement as recited in claim 1, wherein each inwardly projecting tab includes two C-shaped longitudinal inner channels and wherein the inner surface includes two C-shaped longitudinal outer channels between adjacent inwardly projecting tabs.

7. A multi-path cooling arrangement as recited in claim 1, wherein each inwardly projecting tab in stair-like, including first and second levels each; the first level including a first generally C-shaped longitudinal inner channel and the second level including a second generally C-shaped longitudinal inner channel.

8. A multi-path cooling arrangement as recited in claim 7, wherein the at least two cooling tubes include a first cooling tube so folded as to form a first serpentine having straight portions so configured and sized as to be inserted in the generally C-shaped outer channels; a second cooling tube so folded as to form a second serpentine having straight portions so configured and sized as to be inserted in the first generally C-shaped longitudinal inner channel; and a third cooling tube so folded as to form a second serpentine having straight portions so configured and sized as to be inserted in the second generally C-shaped longitudinal inner channel.

9. A multi-path cooling arrangement as recited in claim 7, wherein:
the inner surface includes four generally C-shaped outer channels between adjacent stair-like inner tabs;
the at least two cooling tubes includes a plurality of first generally U-shaped cooling tubes each including a first straight portion so configured and sized as to be inserted in one of the four C-shaped outer channels adjacent one inner projecting tab and a second straight portion so configured and sized as to be inserted in one four of the C-shaped inner channels adjacent another inner projecting tab;
the at least two cooling tubes includes a plurality of second generally U-shaped cooling tubes each including a first straight portion so configured and sized as to be inserted in one of the four C-shaped outer channels and a second straight portion so configured and sized as to be inserted in the first generally C-shaped longitudinal inner channel of a respective tab; and
the at least two cooling tubes includes a plurality of third generally U-shaped cooling tubes each including a first straight portion so configured and sized as to be inserted in one of the four C-shaped outer channels and a second straight portion so configured and sized as to be inserted in the second generally C-shaped longitudinal inner channel of a respective tab.

10. A multi-path cooling arrangement as recited in claim 9, wherein the first, second and third generally U-shaped cooling tubes are identical.

11. A multi-path cooling arrangement as recited in claim 1, wherein the inner and outer channels are closed C-shaped channels.

12. A multi-path cooling arrangement as recited in claim 1, wherein the inner and outer channels are open C-shaped channels.

13. A multi-path cooling arrangement as recited in claim 1, wherein said extraction of the heat stored in the stator is done via a circulation of cooling fluid in said cooling tube.

14. A multi-path cooling arrangement as recited in claim 1, wherein the at least two cooling tubes are made of copper tubing.

15. A stator provided with an integrated multi-path cooling arrangement, the stator comprising:
a plurality of stacked laminations each provided with a central aperture defining an inner surface of the stator; the inner surface being provided with generally C-shaped outer channels and with inwardly projecting tabs monolithically formed with the stator and each provided with at least one generally C-shaped inner channel; and
at least two cooling tubes so configured and sized as to be inserted in the inner and outer C-shaped channels of the stator;
wherein heat present in the stator is extractable by said cooling tube.

* * * * *